March 24, 1959     T. K. CRAMER     2,878,517

MOLD FOR ANNULAR PLASTIC ARTICLES

Filed Dec. 14, 1955

INVENTOR.
TREVOR K. CRAMER,
BY
ATTORNEYS.

United States Patent Office 2,878,517
Patented Mar. 24, 1959

2,878,517

MOLD FOR ANNULAR PLASTIC ARTICLES

Trevor K. Cramer, Crawfordsville, Ind., assignor to Plastene Corporation, Crawfordsville, Ind., a corporation of Indiana Application December 14, 1955, Serial No. 553,027

3 Claims. (Cl. 18—42)

This invention relates to the molding of annular or other ring-like objects from a flowable material, such as a thermoplastic synthetic resin. In the manufacture of such objects as heretofore practiced, it has been customary to gate the mold-cavity at one point or at a plurality of circumferentially spaced points, the molding material entering such gate or gates and then flowing circumferentially within the cavity. Such method, whether the material enters the mold cavity through one gate or through a plurality of spaced gates, has the disadvantage that material flowing in opposite circumferential directions from the gate or gates meets to form a weld line which is frequently visible in the finished article. The weld line is especially noticeable when the molding material is of such a nature that the finished article possesses a marbleized appearance; for the marbleized pattern generally reproduces flow lines in the molding material and such flow lines exhibit abrupt changes in direction points where the flowing streams of material divide or meet.

It is an object of this invention to eliminate weld lines in annular or other ring-like molded articles and to improve the appearance of molded marbleized articles having a ring-like shape.

In carrying out my invention, I provide the mold with a circumferentially continuous auxiliary channel lying close to and paralleling the main mold cavity and communicating therewith through a circumferentially continuous, relatively narrow slot or gap. Such channel is gated, preferably at a plurality of circumferentially spaced points communicating with the channel on that side thereof remote from the aforesaid gap or slot. The cross-sectional dimensions of the channel and the width of the gap or slot are so related that the material injected into the channel through the gates will flow circumferentially thereof more readily than it will through the gap. As a result, the channel will be substantially filled and the molded material therein substantially continuous circumferentially before it enters the main mold cavity; and when the material does enter the main mold cavity, it enters approximately simultaneously at all points in the circumference thereof and flows generally radially.

In the accompanying drawing, which illustrates the invention:

Figure 1:
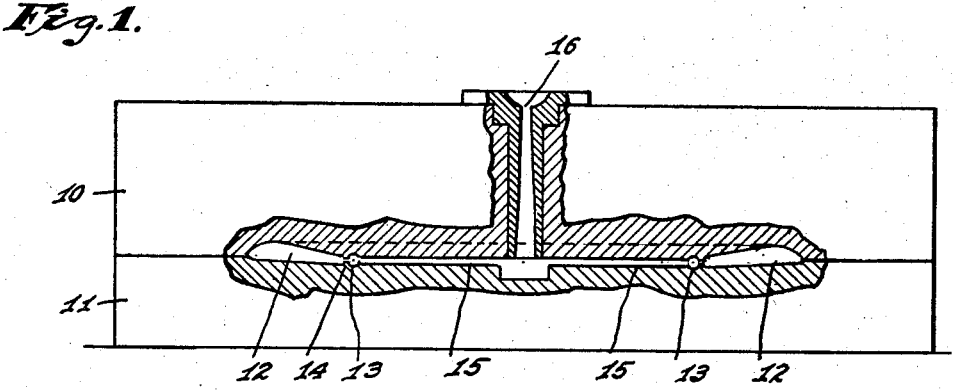
Fig. 1 is a section on the line 1—1 of Fig. 2 through a two-part mold.
Figure 2:
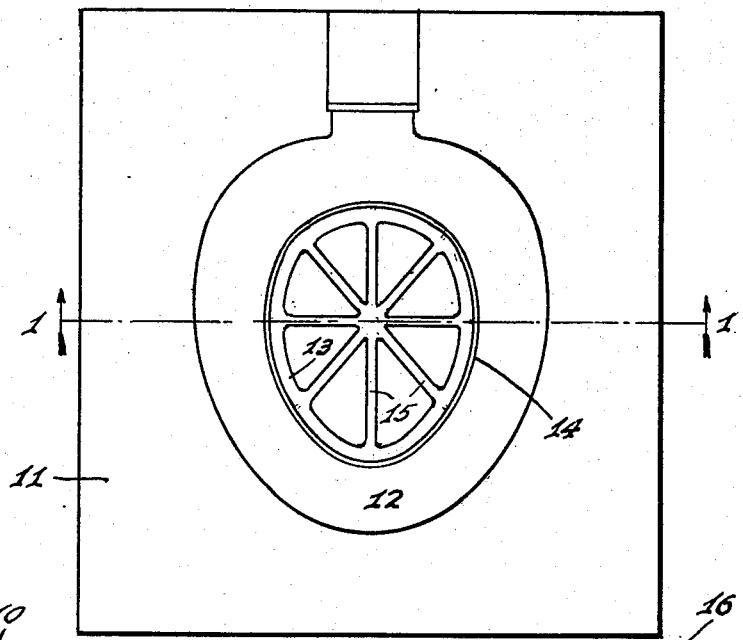
Fig. 2 is an elevational view of one of the two mold parts shown in Fig. 1.
Figure 3:
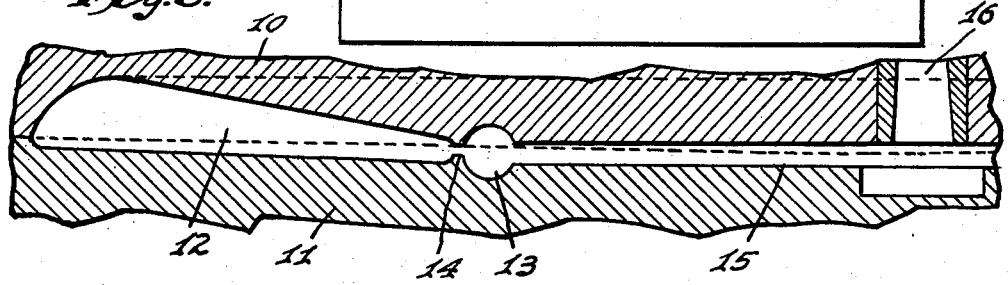
Fig. 3 is a fragmental view similar to Fig. 1 but on an enlarged scale.

The particular mold shown in the drawing comprises two parts 10 and 11 provided in their opposed faces with complementary grooves providing a circumferentially continuous mold cavity 12 in which the article is formed. Other grooves in the mold parts define an auxiliary channel 13 which is circumferentially continuous and which communicates with the mold cavity 12 through a narrow gap or slot 14, likewise circumferentially continuous. Still other grooves in the mold parts define a series of runners 15 communicating with the channel 13 at spaced points in its circumference and radiating from a central sprue 16 which extends through the mold part 10 and is adapted at its outer end for connection to an injection passage of a molding machine.

When a mold embodying my invention is in use, the two mold parts 10 and 11 are closed, as shown in Fig. 1, and the plastic molding composition is injected into the outer end of the sprue 16. At the inner end of the sprue, such material divides among the runners 15 and flows into the auxiliary channel 13. The width of the gap 14 through which the channel 13 communicates with the main mold cavity is so small in comparison with the cross-sectional area of the channel 13 that the molding material flows circumferentially of such channel and substantially fills it before the pressure within the channel becomes sufficient to force the material through the narrow gap 14 into the main mold cavity 12. As a result, the material is supplied to the main mold cavity substantially simultaneously at all points along the circumference thereof, the flow of the material within the main mold cavity is generally radial, and no weld lines are created in the finished product.

It will be understood that in the drawings I have illustrated only those features which are necessary to an understanding of my invention. A complete mold would embody guide pins, a stripping device, cooling passages, and other features which I have not illustrated as their nature is well known.

It will be understood that my invention is not limited to the molding of any particular annular or ring-like article and that modifications within the scope of the appended claims may be met without departing from the invention.

I claim as my invention:

1. An injection mold for molding a ring-like article, said mold having a ring-like main cavity in which the article is to be formed, a ring-like auxiliary cavity paralleling and spaced inwardly from the inner margin of said main cavity, a substantially continuous gap interconnecting said two cavities, and a passage system for supplying molding material to said auxiliary cavity at points spaced therealong, the width of said gap being small enough relative to cross-sectional dimensions of said auxiliary channel to insure that molding material supplied through said passage system will flow circumferentially in and fill the auxiliary cavity before any substantial quantity of such material is forced through said gap into the main cavity.

2. A mold as set forth in claim 1 with the addition that said passage system includes a central sprue extending from the plane of said auxiliary cavity for connection to a source of molding material under pressure, and radiating runners interconnecting said sprue with the auxiliary cavity.

3. An injection mold for molding a ring-like article, said mold having a ring-like main cavity in which the article is to be formed, a ring-like auxiliary cavity paralleling and spaced from a margin of said main cavity, a substantially continuous gap interconnecting said two cavities, and a passage system for supplying molding material to said auxiliary cavity at points spaced therealong, the width of said gap being small enough relative to cross-sectional dimensions of said auxiliary channel to insure that molding material supplied through said passage system will flow circumferentially in and fill the auxiliary cavity before any substantial quantity of such material is forced through said gap into the main cavity.

(References on following page)

References Cited in the file of this patent

UNITED STATES PATENTS

| | | |
|---|---|---|
| 2,431,349 | Stacy | Nov. 25, 1947 |
| 2,696,640 | Wienand | Dec. 14, 1954 |
| 2,779,971 | Castellan | Feb. 5, 1957 |

FOREIGN PATENTS

| | | |
|---|---|---|
| 520,637 | Belgium | June 30, 1953 |

OTHER REFERENCES

Ser. No. 368,312, Hemple (A.P.C.), published Apr. 27, 1943.